United States Patent [19]
Heitman

[11] Patent Number: 4,875,106
[45] Date of Patent: Oct. 17, 1989

[54] METHOD AND APPARATUS FOR CONCEALING ERRORS IN REPRODUCED DIGITAL SIGNALS UTILIZING FIR FILTER

[75] Inventor: Jürgen Heitman, Alsbach/Hähnlein, Fed. Rep. of Germany

[73] Assignee: Robert Bosch GmbH, Stuttgart, Fed. Rep. of Germany

[21] Appl. No.: 198,133

[22] Filed: May 24, 1988

[30] Foreign Application Priority Data

Jun. 11, 1987 [DE] Fed. Rep. of Germany ....... 3719405

[51] Int. Cl.$^4$ .............................................. H04N 5/94
[52] U.S. Cl. .................................... 358/314; 358/336; 358/166; 360/38.1
[58] Field of Search ............... 358/160, 166, 167, 314, 358/336, 340; 360/38.1

[56] References Cited
U.S. PATENT DOCUMENTS 4,837,624 6/1989 Heitmann et al. .................. 358/166

Primary Examiner—Robert L. Richardson
Attorney, Agent, or Firm—Frishauf, Holtz, Goodman & Woodward

[57] ABSTRACT

A finite impulse response filter is used for providing substitute sample values for erroneous sample values and isolated erroneous sample values appear. When sample values needed for contributing to the concealment of an erroneous value by the filter are also marked as erroneous, they are replaced by the corresponding sample value in the preceding television line, as represented by the output of the FIR filter, delayed by one line. In the case of the first line, the last error-free sample value in the same line, or an average of neighboring sample values, is used as an auxiliary value for calculation of a replacement value in the FIR filter.

8 Claims, 2 Drawing Sheets

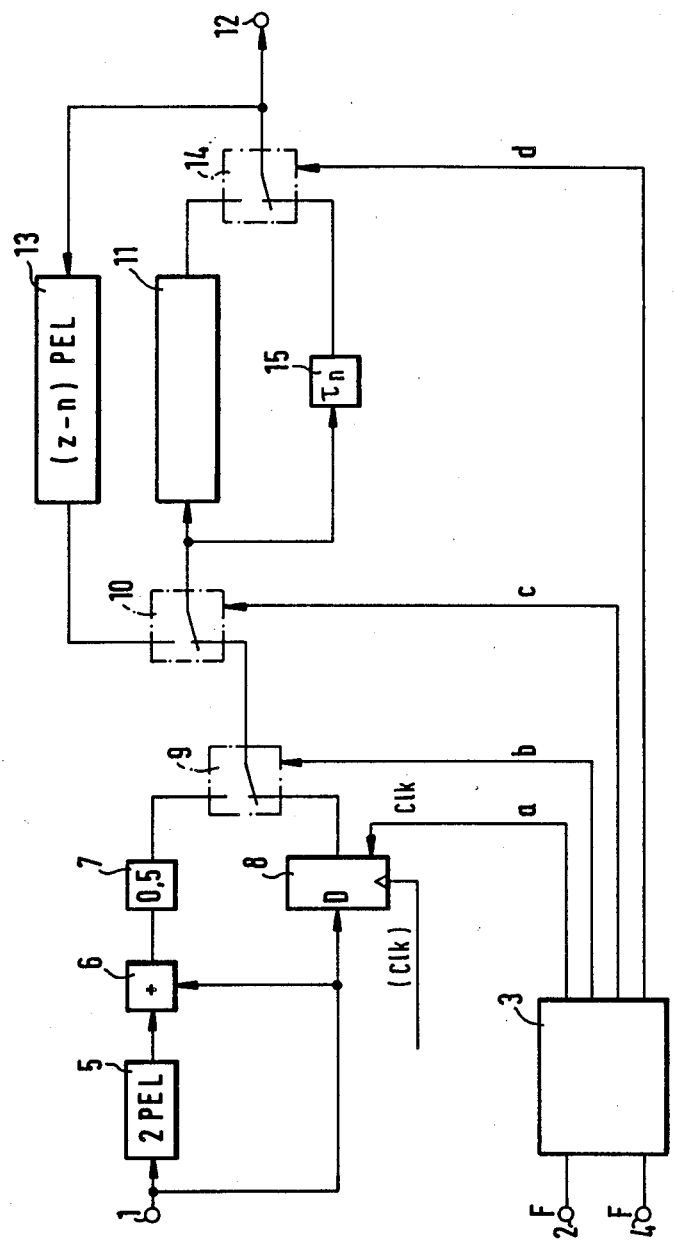

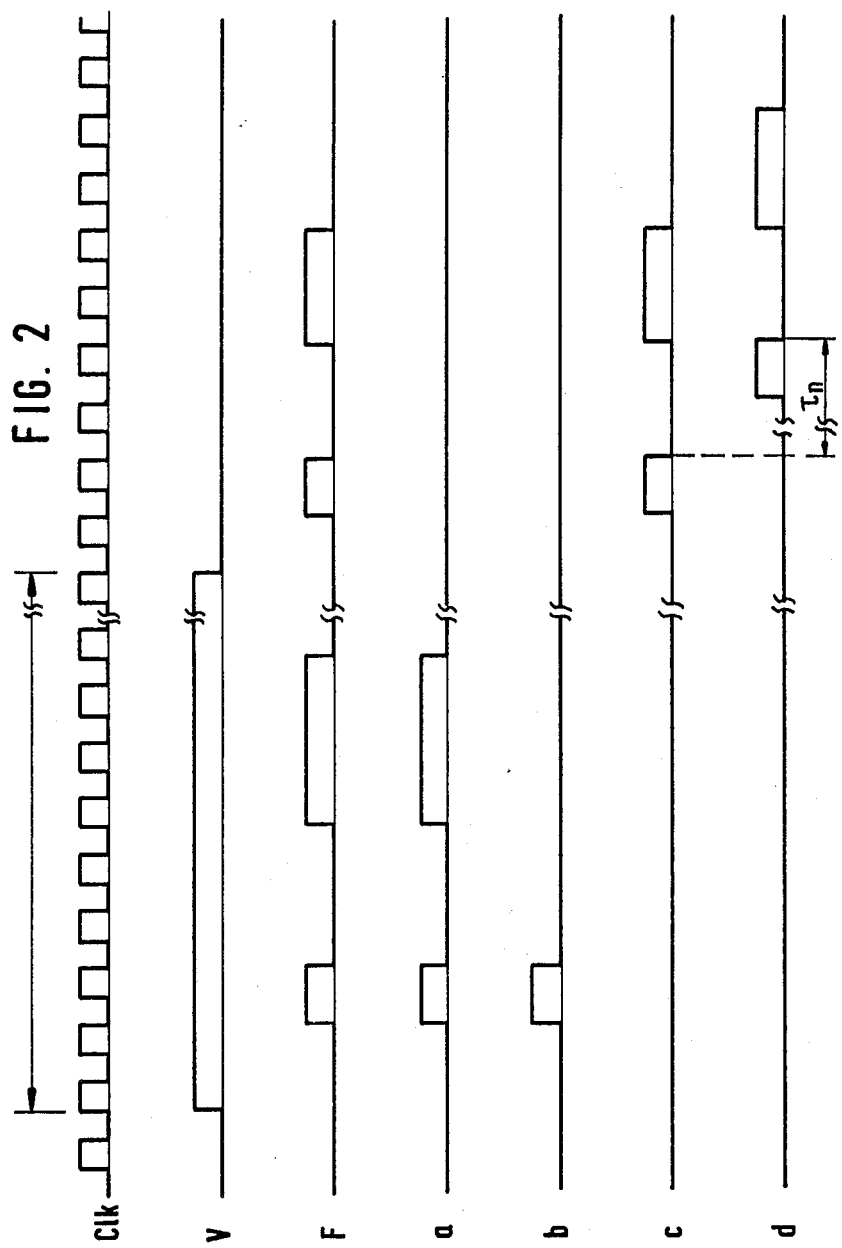

METHOD AND APPARATUS FOR CONCEALING ERRORS IN REPRODUCED DIGITAL SIGNALS UTILIZING FIR FILTER

CROSS REFERENCE TO PENDING APPLICATIONS ON RELATED SUBJECT MATTER:

Application of Jurgen Heitmann, Rolf Loos and Roland Mester, Serial No. 27/193,903, claiminng priority of German Patent Application No. P 37 18 567, filed June 3, 1987.

Application of Roland Mester, Serial No. 07/198135, claiming priority of German Patent Application P 37 18 566 filed June 3, 1987.

Application of Roland Mester, Serial No. 07/198131, claiming priority of German Patent Application P 37 19 404 filed June 11, 1987.

Application of Hannfried Preissler, Serial No. 07/202192, claiming priority of German Patent Application P 37 19 406 filed June 11, 1987.

This invention concerns error concealment in digital video signals in which previously marked erroneous sample values are This invention concerns error concealment in digital video signals in which previously marked erroneous sample values are replaced by substitute values derived from a number of other sample values by means of filters of finite impulse response (FIR filters).

A method for digital recording and reproduction of video signals is described in the publication "Standard for Recording Digital Television Signals on Magnetic Tape in Cassettes" of the European Broadcasting Union, TECH. 3252-E and in the periodical Fernseh- und Kinotechnik 1987, Heft ½, pages 15–22.

In the reproduction of digitally recorded video signals error corrections are performed according to various known methods by similarly recorded check signals. The correction of errors in that way is possible only to a certain extent, however. If more errors occur within a data block protected by check words within certain limits than are correctable on the basis of the properties of the error correction system, sample values or pictures points (pixels) will be designated as erroneous by the known methods without any possibility of correcting the errors.

The erroneous sample values thus designated can be replaced with substitute values by likewise known methods in which the substitute values are calculated by the use of digital FIR filters. For the usual filter length of n sample values it is then necessary that all of the sample values used for the calculation of the substitute value should be error free. That, however, is in general not the case.

SUMMARY OF THE INVENTION:

It is an object of the present invention to make possible replacement of an erroneous sample value with a substitute value even when certain of the neighboring sample values are also erroneous.

Briefly, erroneous sample values are located and if they are necessary for calculation of substitute values, they are first replaced by auxiliary values. For example the auxiliary values can be formed from one or more error free sample values relating to pixels which, so far as possible, are in the neighborhood of the pixel corresponding to the sample value to be replaced by the auxiliary value.

The particular ways in which it is most advantageous to obtain such an auxiliary value will be better understood through the detailed description that follows.

BRIEF DESCRIPTION OF THE DRAWINGS:

The invention is further described by way of illustrative example by reference to the annexed drawings, in which:

FIG. 1 is a circuit block diagram of an embodiment of the invention and

FIG. 2 is a timing diagram showing various signals on a common timescale.

DESCRIPTION OF THE ILLUSTRATED EMBODIMENT:

FIG. 1 shows, in block circuit diagram, equipment for carrying out the method of the invention. The equipment shown is part of the reproduction circuits of a digital video tape apparatus, for example the portion designated "concealment" in the block circuit diagram of FIG. 11 of the above-identified article in Fernseh- und Kinotechnik. In the drawing, the short designation referring to one or more picture elements is "PEL" rather than the longer common shortened expression "pixel".

At the input 1 the digital video signals are supplied already corrected for errors so far as possible. For uncorrectable sample values already recognized as erroneous an error signal is supplied to the input 2. The error signal then goes to an error evaluation circuit 3 to which there is supplied, through an input 4, a vertical scan frequency synchronizing pulse V.

The digital video signal supplied at 1 goes into a circuit for forming an average value consisting of a storage unit 5, an addition circuit 6 and a multiplication circuit 7. A by-pass register 8 is provided parallel to the average forming circuit and is also connected to the input 1. The output of the multiplication circuit 7 and the output of the register 8 are respectively connected to selectable inputs of a first change-over switch 9 having an output connected in turn to a selectable input of a second change-over switch 10.

The output of the second change-over switch 10 is connected with the input of a FIR filter 11 of a known kind that does not need to be described here. Such filters are described for example in the book from Rabiner/Gold: "Theory and Application of Digital Signal Processing", 1975, p. 75 ff.

The output of the FIR filter 11 is connected to a selectable contact of a third change-over switch 14, the output of which provides the output 12 of the equipment shown in FIG. 1 and is connected also to the input of a storage unit 13. The output of the storage unit 13 is connected to an additional selectable input of the second change-over switch 10. The output of the second change-over switch 10, in addition to being connected as above described to the filter 11 is also connected through a delay circuit 15 to a second selectable input of the third change-over switch 14. The storage unit 13 can be provided as a shift register that accepts (z−n) sample values so that with clocking at the sampling frequency a delay of individual sample values supplied to the storage unit 13 of (z−n) clock periods is produced, z being the number of sample values or pixels in a line and n is the length of the FIR filter 11 measured in sample values.

An error free signal is guided from the input 1 through the register 8, the change-over switches 9 and 10, the delay circuit 15 and the change-over switch 14 to the output 12 without any change in the signal.

If now an erroneous sample value appears at the input 1 and an error signal at the input 2, it is checked in the error evaluation circuit 3 whether the necessary n sample values for computing the substitute value by means of the FIR filter 11 are error free. If this is the case, the error evaluation circuit 3 puts the change-over switches 9 and 10 into their lower positions, so that the sample values provided for the calculation of the substitution value by the FIR filter 11 will be used.

If it is determined in the error evaluation circuit 3, however, that one or more sample values necessary for calculating the substitution value are erroneous, then, at the times at which those sample values are to be supplied to the FIR filter, the second change-over switch 10 is put into its upper position shown in the drawing. In that way corresponding values of the preceding television line are made available to the FIR filter 11. According to the delay time of the filter the switch 14 is put into its upper position, so that the substitution value calculated by the filter reaches the output 12 and also the input of the storage unit 13 in the place of an erroneous pixel.

Since in the case of the first line following the vertical blanking interval there exists no previous line, the auxiliary value is then derived by averaging two neighboring sample values. For that purpose the second change-over switch 10 is put into the lower position shown in FIG. 1 and the first change-over switch 9 into its upper position. The addition circuit 6 then adds the sample value supplied to the input 1 and the before-last sample value read out of the storage unit 5. The sum is then multiplied in the multiplier circuit 7 by 0.5. This multiplication is readily performed in binary code by a one place shift to the right.

FIG. 2 shows the clock signal Clk on the top line of the timing diagram. In the second line a pulse designated V is shown which appears during the presence of the first line following a vertical scan frequency blanking interval. FIG. 2 also shows an example of an error signal and individual control signals equivalent to those designated by FIG. 1, which are supplied to the change-over switches and the register 8 by the error evaluation circuit 3. The control signals are shown in such a way that the signal level shown as the upper level in the drawing corresponds to the upper position of the switch.

In the case of the signal on line a the upper level corresponds to the clocking of the register 8 of FIG. 1. So long as no error appears the change-over switches 9, 10 and 14 are in the (lower) positions shown in FIG. 1. The first error shown in line F produces an averaging of the sample values of the neighboring pixels. For that purpose the switch 9 is brought into its upper position and the register 8 is not clocked. In this case sample value corrected by averaging is supplied to the change-over switch 10 and thereby to the FIR filter 11 and the delay circuit 15, so that in this region no further steps for error concealment are taken.

In the following error three sample values are tagged by the error signal F. In this case no averaging follows. The switch 9 remains accordingly in its lower position. The last error free sample value is then read-out of the register 8 a corresponding number of times. The change-over switches 10 and 14 in this case also remain in the lower position.

The signals in FIG. 2 are shown interrupted, since the line contains substantially more clock pulses than can be shown in the drawing. After the end of the pulse V the second line begins, for which, in case of erroneous sample values, substitute values from the previous line can be used. Both in the case of isolated errors and also in the case two successive erroneous sample values the change-over switch 10 will now be brought into the upper position by means of the control signal c. Then the output signal of the FIR filter 11, which is delayed by one line less the width of the FIR filter, is used instead of the erroneous sample value. The change-over switch 14 will then be put in its upper position for the duration of the error at a time delayed by the propergation time of the FIR filter, so that during this time the output signal of the FIR filter 11 is supplied to the output 12.

The illustrated embodiment is suitable for use in the luminance channel of a digital video tape machine. In the chrominance channel such a video tape machine chrominance, however, the color difference signals are transmitted in time multiplex, however. In this connection the illustrated example can be made suitable in a simple way by the use of two chrominance registers 8 connected in parallel. Accordingly, in the formation of average values, not the sample values immediately neighboring in time, but the after-next sample values are to be used. In a similar way the same kind of FIR filter can also be used for each of the color difference signals by having the filter coefficient of every other sample value set to zero.

Although the invention has been described with reference to a particular illustrative embodiment, it will be recognized that modifications and variations are possible within the inventive concept.

We claim:

1. Method of concealing errors in the reproduction of recorded digital video signals comprising successions of digital words corresponding to pixels, comprising the steps of:

detecting erroneous pixel words and replacing them with artificial pixel words marking the presence of an erroneous pixel while also supplying an error designating signal in timed relation to each said artificial pixel word;

passing successive pixel words through a finite-impulse-response (FIR) digital filter for correction of erroneous pixel words under control of a signal derived from said error designating signals when said erroneous pixel words respectively are in a central position in said FIR filter, and transmitted to said FIR filter in the event that more than one erroneous pixel word is to be present at the same time in said filter, said auxiliary pixel words being derived from values of pixels neighboring the pixel represented by the erroneous pixel word to be replaced thereby.

2. Method according to claim 1, wherein, in the event said erroneous pixel word is in the first line of a picture field following a vertical blanking interval, the last previous error-free pixel word value in the same line is used as an auxiliary pixel word for substitution in place of said erroneous pixel word.

3. Method according to claim 1, wherein, in the event said erroneous pixel word is in the first line of a picture field following a vertical blanking interval, an average of the neighboring pixel values are used as an auxiliary pixel value for replacing erroneous pixel word provided that both said neighboring pixel values are error free and in all other cases the pixel value of the last previous error-free pixel word in the same line is used as the auxiliary pixel value for replacing said erroneous pixel word.

4. Apparatus as defined in claim 1, wherein, in the event said erroneous pixel value is in a picture line separated by at least one line from the most recent vertical blanking interval, an output pixel value of said FIR filter delayed by one line period less the propagation time of said filter is used as an auxiliary pixel value for replacing said erroneous pixel word.

5. Apparatus as defined in claim 2, wherein, in the event said erroneous pixel value is in a picture line separated by at least one line from the most recent vertical blanking interval, an output pixel value of said FIR filter delayed by one line period less the propagation time of said filter is used as an auxiliary pixel value for replacing said erroneous pixel word.

6. Apparatus as defined in claim 3, wherein, in the event said erroneous pixel value is in a picture field line separated by at least one line from the most recent vertical blanking interval, an output pixel value of said FIR filter delayed by one line period less the propagation time of said filter is used as an auxiliary pixel value for replacing said erroneous pixel word.

7. Apparatus for concealing errors in the reproduction of recorded digital video signals comprising a succession of digital words corresponding to pixels, including a source of said video signals wherein each erroneous pixel word is marked by a distinct artificial pixel value and a source of error designating signals timed to coincide with the appearance of a marked erroneous pixel value at said source of said video signals;

a finite-impulse-response (FIR) digital filter (11), having an input and an output and having a predetermined time of propagation therethrough, for replacing every said erroneous pixel when said erroneous pixel is in a central position in said FIR filter;

means for deriving an average value of neighboring pixels bracketing said marked erroneous pixel for substitution as an auxiliary value for said erroneous pixel when said erroneous pixel is in a position in said FIR filter other than said central position, said average value deriving means being interposed between said source of video signals and said input of said FIR filter, and also having a controllable bypass register for replacing its output;

a first change-over switch (10) having a first selectable contact connected to the output of said average value deriving means and having a second selectable contact and a selection output contact, said selection output contact being connected to said input of said FIR filter;

signal storage means (13), having an input connected to the output of said FIR filter (11) and an output connected to said second selectable contact of said first change-over switch (10), for delaying the output of said filter (11) for the period of one picture line less the propagation time of said FIR filter;

an evaluation circuit (3) having inputs connected to a source of vertical synchronizing pulses and to said source of error designating signals, a first output providing a signal designating erroneous pixel values appearing in the first picture line following a vertical blanking interval and second output for controlling said first change-over switch 10, said first output being connected for controlling said by-pass register of said average value deriving means for by-passing it in the absence of an error designating signal and also during those lines of a picture field which follow the first picture line a vertical blanking interval, and said second output being connected for operating said first change-over switch (10) when an error designation signal is present in a picture line separated by more than one line period from the most recent vertical blanking interval, and means, including a third change-over switch (14) controlled by said evaluation circuit (3) and interposed between the output of said FIR filter (11) and the input of said signal storage means (13), for substituting a propagation-time compensated bypass signal from the input of said filter for the output of said filter when no erroneous pixel is being replaced by said filter output.

8. Apparatus according to claim 7, wherein said video signals are color television signals and include digital words representing, in alternation to color difference signals, and wherein two registers are provided for storage said respective color difference signals, connected in parallel and are alternately loaded in response to load control signals.

* * * * *